Figure 1:
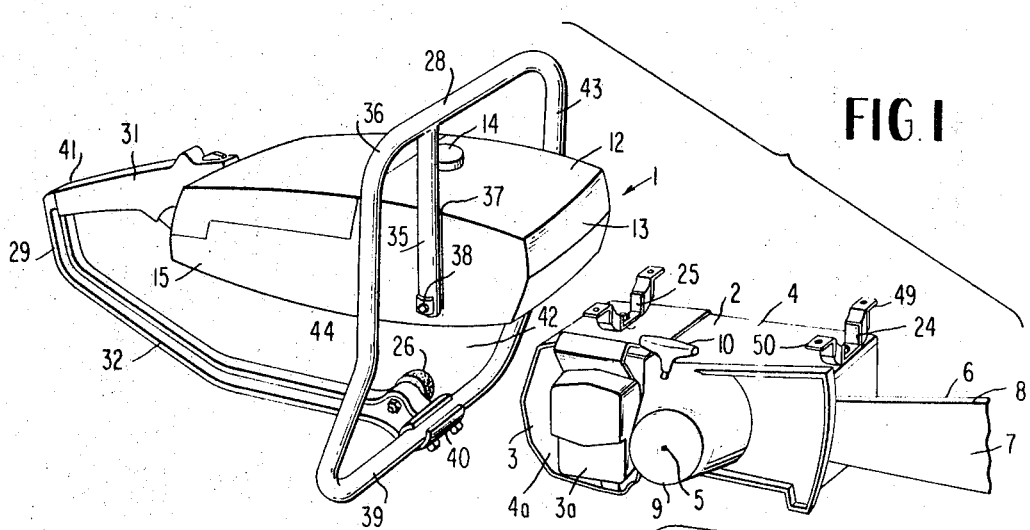

United States Patent

[11] 3,542,095

| [72] | Inventors | Robert Eugene Frederickson<br>South Gate;<br>Walter Joseph Hammond, Lakewood,<br>California |
|---|---|---|
| [21] | Appl. No. | 750,082 |
| [22] | Filed | Aug. 5, 1968 |
| [45] | Patented | Nov. 24, 1970 |
| [73] | Assignee | McCulloch Corporation<br>Los Angeles, California<br>a corporation of Wisconsin |

[54] CHAIN SAW WITH VIBRATION ISOLATION SYSTEM
6 Claims, 8 Drawing Figs.
[52] U.S. Cl.................................................. 143/32, 173/162
[51] Int. Cl................................................. B27b 17/02
[50] Field of Search........................................ 143/32; 173/162

[56] References Cited
UNITED STATES PATENTS

| 3,140,746 | 7/1964 | LaForce | 143/68 |
| 3,224,473 | 12/1965 | Dobbertin et al. | 143/32 |
| 3,372,718 | 3/1968 | Irgens | 143/32 |
| 3,409,056 | 11/1968 | Rault | 143/32 |

Primary Examiner—Donald R. Schran
Attorney—Burns, Doane, Benedict, Swecker & Mathis ABSTRACT: A chain saw including a first assembly and a second assembly. The first assembly includes a chain saw engine, a guide bar, and a drive system. The second assembly includes a fuel tank and carburetor Vibration isolating means are interposed between the two assemblies. A handle network defines a cagelike structure, within which the first assembly is resiliently supported by vibration isolation means.

Patented Nov. 24, 1970

3,542,095

Sheet 1 of 3

INVENTORS
ROBERT EUGENE FREDERICKSON
WALTER JOSEPH HAMMOND

BY *Burns, Doane, Benedict, Swecker & Mathis*

ATTORNEYS

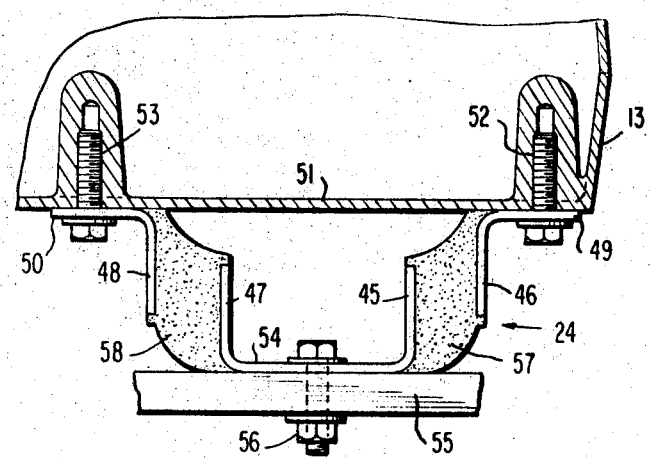
FIG.3
FIG.5
FIG.4
FIG.8
FIG.7
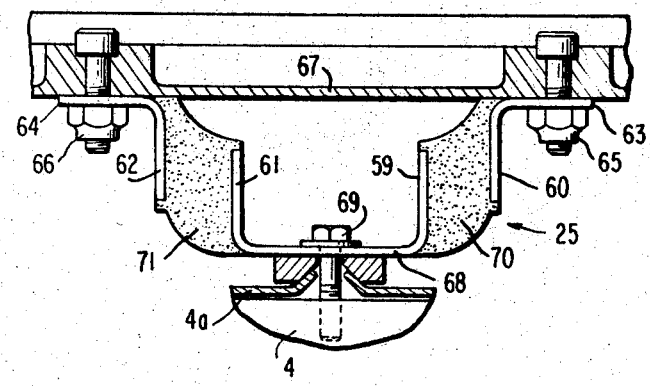
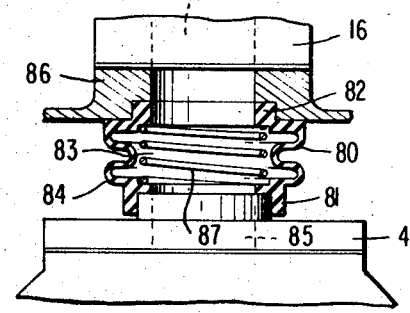
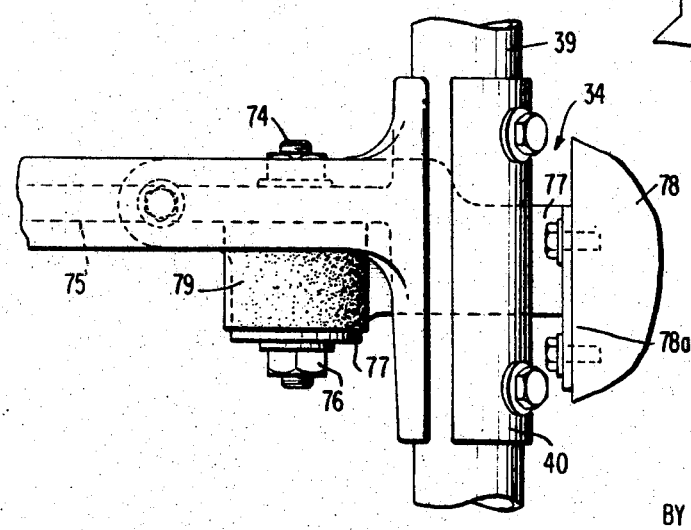
INVENTORS
ROBERT EUGENE FREDERICKSON
WALTER JOSEPH HAMMOND
BY
ATTORNEYS

CHAIN SAW WITH VIBRATION ISOLATION SYSTEM

GENERAL BACKGROUND, OBJECTS, AND SUMMARY OF INVENTION

Those skilled in the chain saw art have recognized for many years that portable chain saws are characterized by a high degree of vibration.

This degree of vibration tends to produce operator fatigue when chain saws are used for prolonged periods of time.

Substantial efforts have been devoted to minimizing the level of vibration in portable chain saws. For example, in a U.S. Irgens Pat. No. 3,372,718, a system is disclosed where the vibrating components of a chain saw generate vibrations in multiple planes. Vibration isolating means incorporated in the Irgens saw are aligned with only one vibration plane and substantially increase the width or lateral bulk of a chain saw. Further, the Irgens proposal requires a vibration isolating coupling in the drive chain between an engine and a cutter chain, with the obvious disadvantages of structural complexity and reduced efficiency in the transmission of force to the cutter chain.

Further, vibrations generated in one plane by the Irgens engine crankshaft impose compressive forces on the vibration isolating system of the Irgens chain saw so as to directly exert substantial compressive forces on an engine body.

Another attempt at seeking to minimize chain saw vibration is evidenced by a U.S. Dobbertin et al. Pat. No. 3,224,473. The Dobbertin et al. system requires the extensive use of annular, shock absorbing units. This proposal obviously complicates the mounting of the cutter chain and engine system. Further, the Dobbertin et al. system contemplates the use of shock absorbing elements which operate in compression so as to inherently exert substantial distortion forces on an engine assembly. Further in this Dobbertin et al. chain saw, attempts to manipulate a chain saw by a handle inherently impose forces on a drive chain, which forces are likely to induce distortion and damage.

It is an object of the present invention to advance the art beyond proposals such as those featured in the Irgens and Dobbertin et al. patents by providing a vibration isolation system in a chain saw which minimizes the exertion of reaction forces on drive chain and engine components.

It is another object of the invention to provide such a vibration isolation system where a cutter chain and engine crankshaft are arranged to generate vibrations predominantly aligned in a single plane, with vibration isolation elements being generally aligned with this plane so as to cradle vibrating components within a cagelike handle network.

It is another object of the invention to provide such a cagelike network where handle portions are interconnected at generally right angles so as to minimize the tendency of vibrations acting on separate handle components to reinforce each other.

Yet another object of the invention is to provide a vibration isolation system for a chain saw where an operator exerts manipulative force on a handle without exerting distorting forces on a drive chain.

Another principal object of the invention is to provide a shock absorbing network arranged in a generally triangular pattern about a center of mass of vibrating components so as to effectively absorb and contain vibration engendered forces.

It is another object of the invention to employ a unique system of vibration isolating mounts where vibration is predominantly absorbed in shear, without imposing compressive forces on engine components, and where such minor compressive forces as might be generated are absorbed in a direction extending tangentially of and externally of an engine housing.

It is also an object of the invention to incorporate a fuel tank and carburetor housing in a handle network, in a unique fashion, so as to constitute an inertial dampening portion of a cage assembly within which vibrating components are resiliently suspended.

It is a further object of the invention to employ a generally rhomboidal shock absorbing mass which functions in shear to absorb vibrational shocks, while permitting optimum noninterfering displacement between chain saw components without exerting compressive forces directly on mutually isolated chain saw components.

In accomplishing at least some of these objectives, there is presented through the invention a chain saw comprising first handle means having a passage extending therethrough. A second, generally U-shaped handle means, having a pair of spaced leg portions, is connected with spaced portions of the first handle means. These leg portions extend generally longitudinally of an axis of the aforesaid passage. Interconnected engine means and cutter chain means pass longitudinally through the passage. A plurality of vibration isolating means yieldably interconnect the interconnected engine means and cutter chain means with each of the leg portions of the second handle means. A vibration dampening mass, including a fuel tank, is carried by the first and second handle means. The first handle means provides a force-transmitting connection between the legs of the second handle means.

A related and independently significant facet of the invention pertains to the arrangement, in a chain saw, of plural vibration isolating units to define a generally triangular shock absorbing network more or less aligned with a principal vibration plane and disposed about a center of mass of a vibration generating assembly.

Yet another independently significant facet of the invention involves a unique utilization of shock absorbing units which serve to isolate vibration and absorbing forces in a shear direction without imposing substantial compressive forces on engine components. These shock absorbing units are further arranged such that any compressional forces, which might be present, are directed generally tangentially and externally of engine and drive chain components.

A still further aspect of the invention involves a unique arrangement of mutually inclined handle components and a fuel tank housing so as to define a cagelike structure within which vibrating components of a chain saw are resiliently supported or isolated.

DRAWINGS

In describing the invention, reference will be made to a preferred embodiment shown in the appended drawings.

Figure 6:
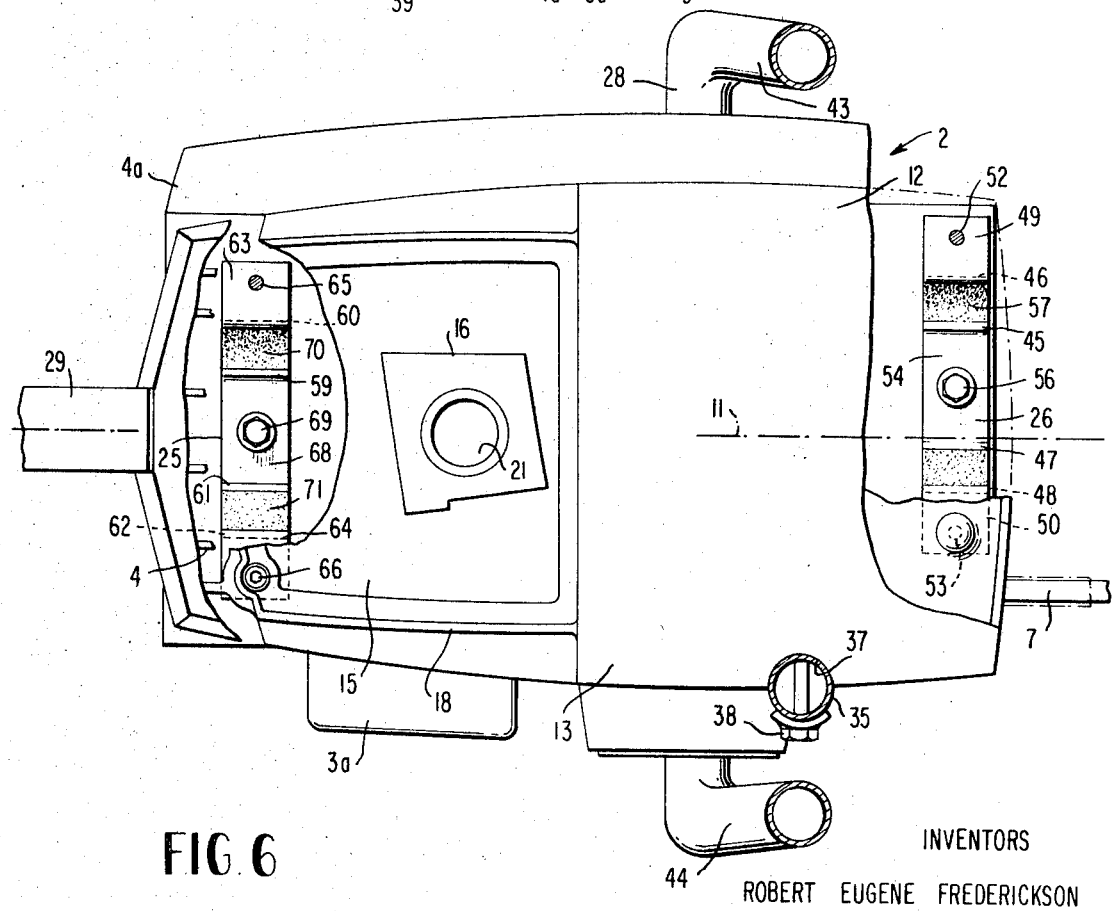
Figure 2:
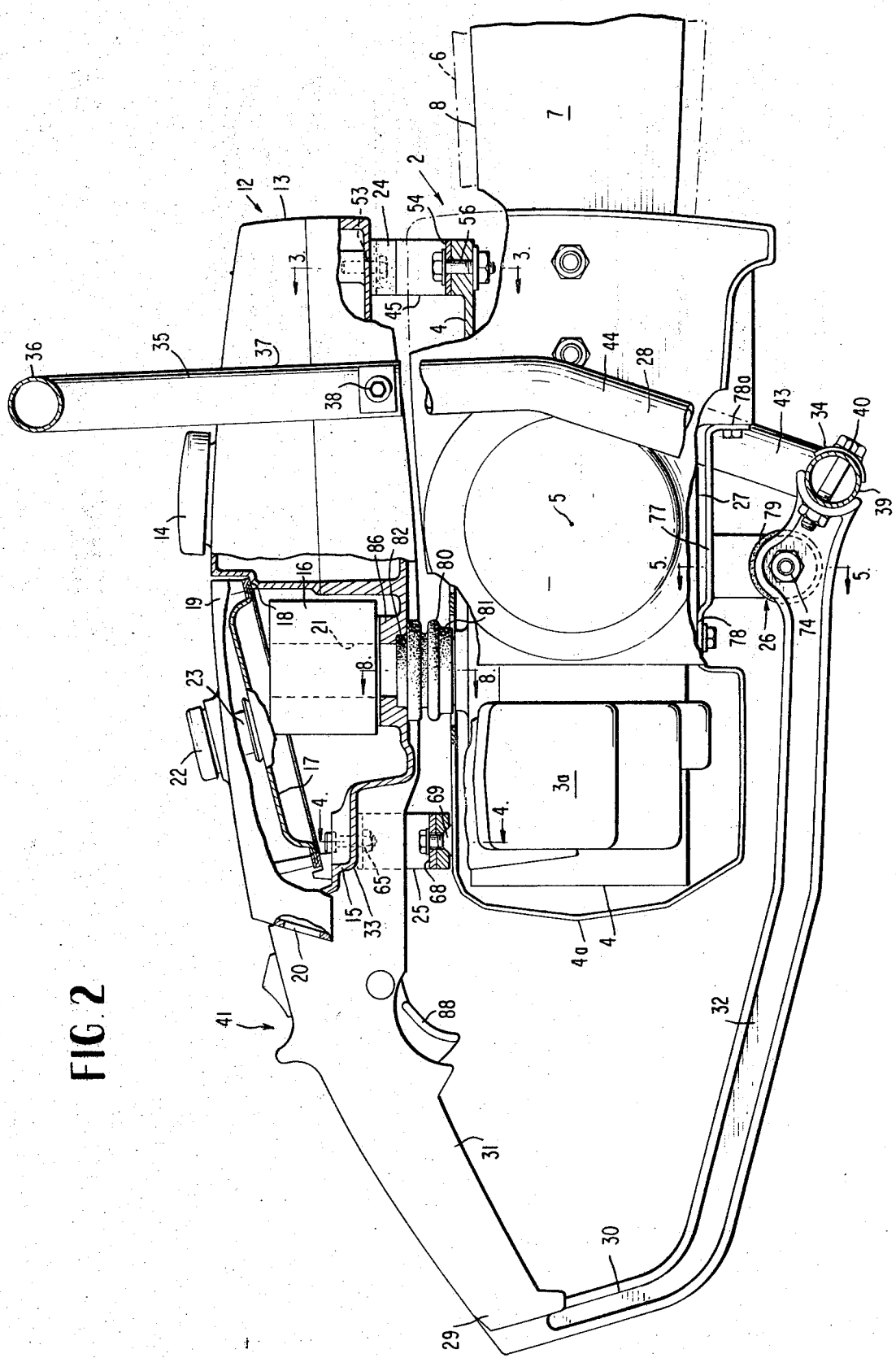

In the drawings:

FIG. 1 provides a perspective, "exploded" view of principal components of a chain saw, illustrating mutually isolated principal assemblies, vibration isolating units, and a cage network defined by interconnected but mutually inclined handles;

FIG. 2 provides a side elevational view, partially sectioned, of the FIG. 1 chain saw;

FIG. 3 provides a transverse sectional view of the FIG. 2 assembly illustrating structural details of a vibration isolating unit mounted generally adjacent the guide bar of the chain saw, as viewed along the section line 3-3 of FIG. 2;

FIG. 4 provides a transverse sectional view of the FIG. 2 assembly, as viewed along the section line 4-4 of FIG. 2, and illustrating structural details of a vibration isolating unit mounted generally adjacent a carburetor housing of the chain saw;

FIG. 5 provides a transverse sectional view of the FIG. 2 assembly, as viewed along the section line 5-5 of FIG. 2, and illustrating structural details of a third vibration isolation unit mounted on the underside of the chain saw and serving to connect an engine, guide bar, cutter chain and drive unit assembly with the handle network of the chain saw;

FIG. 6 provides a top plan, partially fragmentary, view of the FIG. 2 assembly, illustrating, in top plan view, structural details of the shock absorbing units shown in cross section in FIGS. 3 and 4;

FIG. 7 provides a bottom plan view of the portion of the FIG. 2 assembly, illustrating structural details of the third vibration isolation unit; and FIG. 8 provides a transverse sectional view of the FIG. 2 assembly, as viewed along section line 8—8 of FIG. 2, and illustrating structural details of a shielded flexible bellows which provides a passage through which fuel and air may pass from a carburetor to an engine intake port.

MAJOR COMPONENTS

FIGS. 1 and 2 illustrate principal components of the chain saw 1 comprising a preferred form of the invention.

Chain saw 1 includes a first, unitized assembly 2. Unitized assembly 2 includes an internal combustion engine 3. Engine 3 comprises a cast and unitized, cylinder or engine housing 4 which encloses a reciprocating piston, not shown. A shroud 4a partially houses the leftmost end of cylinder or engine housing 4. This known piston is connected with a crankshaft, also not shown, and having an axis of rotation 5. The crankshaft is connected by a drive train to a cutter chain 6.

Cutter chain 6 is mounted on a generally planar guide bar 7. As will be understood, cutter chain 6 comprises an endless, link-type cutter chain mounted in a groove circumscribing the periphery of guide bar 7. Cutter chain 6 is thus free to traverse a travel path defined by the periphery 8 of the guide bar 7. This travel path is substantially aligned with a vertical cutting plane which extends longitudinally of the generally planar guide bar 7. The known drive train, not shown, interconnecting the crankshaft with the cutter chain 6 may include a centrifugal clutch 9 and a starting mechanism 10. A spark arrester or muffler 3a is also included within assembly 2 and unitized with engine 3.

The piston connected with the crankshaft reciprocates along an axis extending longitudinally and parallel with the aforesaid cutting plane. This axis of reciprocation is generally aligned with a longitudinal median plane 11 which extends longitudinally of the chain saw 1 and is disposed in generally parallel relationship with the cutting plane and guide bar 7.

The manner in which engine 3, the piston and crankshaft, the clutch 9, starter 10, guide bar 7, and cutter chain 6 are interconnected is well recognized in the chain saw art and shown in detail, for example, in a publication entitled "McCulloch Shop Manual - Mc 1—10 and Mc 2—10" published in 1965 by the McCulloch Corporation of Los Angeles, Calif.

Chain saw 1 includes a second unitized assembly 12. Assembly 12 comprises a unitary housing defining, at a forward end adjacent the guide bar 7, a fuel tank 13. A conventional closure 14 provides access to the interior of the fuel tank. A rearmost compartment 15 of the fuel assembly 12, located generally adjacent and above the cylinder 4, houses a carburetor 16. Fuel tank 13 is operable to deliver fuel to carburetor 16. An air filter 17 is supported on a housing ledge 18 above the carburetor 16. Filter 17 is secured in place by a removable cover 19. Cover 19 is provided with air openings 20 to admit air for passage through the filter 17 to the upper end of the induction passage 21 of the carburetor 16. Cover 19 may be secured in place by a threaded fitment 22. This fitment engages a threaded stud 23 which may be mounted on, and project upwardly from, the body of the carburetor 16.

The general structural arrangement of the fuel tank 13, cavity 15, carburetor 16, air filter 17, and removable closure 19 is described in the aforesaid McCulloch publication.

As shown in FIG. 2, the second assembly 12 is superposed above the first assembly 2 when the guide bar 7 is oriented to position the cutting plane in substantial vertical alignment.

A first vibration isolation means 24 is interposed between the first and second assemblies generally adjacent the guide bar 7. A second vibration isolation unit 25 is interposed between the first assembly 2 and second assembly 12, generally adjacent the cylinder 4 and carburetor 16. A third vibration isolation means 26 is carried by the underside 27 of the first assembly 2.

A first handle means 28 fully encircles the superposed, first and second assemblies generally adjacent the guide bar 7. This first handle means 28 extends generally transversely of the cutting plane of the guide bar 7 and cutter chain 6.

A second generally U-shaped handle means 29 is connected with the second assembly 12 and the third vibration isolation means 26.

Handle means 29 includes a U-shaped end portion 30 and a pair of vertically spaced leg portions 31 and 32. Upper leg 31 is attached to a housing wall portion 33 of the second assembly 12. Lower leg 32 is connected with the third vibration assembly 26.

The first handle means 28 is connected to the leg 32 of the second handle means 29 at a junction 34, located generally adjacent the third vibration isolation means 26.

As illustrated, handle 29 extends generally longitudinally of, or parallel to, the longitudinal median plane 11. Handle 29 is preferably aligned with plane 11.

A generally vertically extending, force transmitting, strut 35 projects downwardly from an upper portion 36 of handle 28. Supporting strut 35 is connected to a recessed side portion 37 of the fuel tank portion 13 of the second assembly 12. This connection may be effected by conventional threaded fastening means 38, schematically shown in FIG. 2.

The lower portion 39 of handle means 28, which extends beneath the underside 27 of the first assembly 2, and which extends generally transversely of the longitudinal median plane 11, is connected with the handle leg 32 at junction 34 by conventional threaded nut and bolt fastening means 40. Thus, the handle 29, with the extension of leg 31 defined by the second assembly 12, is connected with the upper portion 36 and lower portion 39 of the handle means 28 to define a generally cagelike handle structure 41.

This cagelike structure 41 is characterized by one component, comprising the handle means 28, extending transversely of the longitudinal median plane 11 and another component, comprising the second assembly 12 and handle 29, extending generally longitudinally of this median plane. The vibration isolating units 24, 25 and 26 resiliently support the first assembly 2 within this cage structure.

The assemblies 24, 25 and 26 are more or less longitudinally aligned with the longitudinal median plane 11. While unit 26, as shown in FIG. 7, is slightly displaced from this median plane, and unit 24 is slightly offcenter, it will be recognized that a common plane passing substantially adjacent or contiguous with the plane 11 will intersect each of the units 24, 25 and 26.

Thus, the isolation units 24, 25 and 26 define a generally triangular, resilient support network cradling the assembly 2 within the cagelike structure 41. Preferably, the units 24, 25 and 26 are arranged in an alignment plane, in a more or less equilateral triangular configuration, generally symmetrically arranged with respect to and surrounding the center of mass of the unit 2. This center of mass will be more or less adjacent the axis of rotation 5, in many commercial chain saw embodiments.

Thus, the resilient vibration isolation points 24, 25 and 26 are, in some embodiments, disposed more or less radially equidistant from the center of mass of the vibration generating assembly 2.

As will be further apparent, by reference to the illustrations, assembly 2 is supported within the cage framework 41 so as to project through an opening 42 in the handle means 28. This opening 42 has a longitudinal axis extending generally in alignment with the plane 11. The assembly 2, in passing through the opening 42, is supported between the leg extension-defining assembly 12 and the leg 32, with the handle means 28 serving to provide a force transmitting connection between the leg defining assembly 12 and the leg 32. This force transmission is facilitated by the horizontally displaced, side portions 43 and 44 of handle means 28 which are disposed laterally outwardly of the superposed assembly 2 and 12. These side portions, of course, serve to interconnect the upper and lower handle portions 36 and 39, respectively.

As will be appreciated, with this arrangement of components, the vibration isolating units 24, 25 and 26 serve to absorb vibration shocks in multiple directions, generally aligned with the principal vibration plane which extends generally parallel with the longitudinal median plane 11.

STRUCTURAL DETAILS OF SHOCK ABSORBING SYSTEM

Structural details of the first shock absorbing unit 24 are shown in FIGS. 3 and 6.

Shock absorbing unit 24 includes first, second, third and fourth planar walls 45, 46, 47 and 48, respectively, all of which extend generally parallel to the plane 11. Walls 45 and 47 are disposed, respectively, on opposite sides of the median plane 11. Walls 46 and 48 are located laterally outwardly, respectively, of the walls 45 and 47. The walls 46 and 48 include mounting bracket portions 49 and 50 which are connected to an under wall portion 51 of the assembly 12 by threaded fastening means 52 and 53.

Walls 45 and 47 are interconnected by a transversely extending, force transmitting web 54. Web 54 extends generally tangentially and externally of the cylinder or engine housing 4 and is mounted on a housing portion 55 of the cylinder or engine housing by threaded fastening means 56.

A first, generally rhomboidal, mass 57 of elastomeric material extends between and is bonded to the walls 45 and 46. Mass 57 projects generally outwardly of wall 45, and upwardly away from the assembly 2 toward the wall 46.

Another rhomboidal elastomeric mass 58, related in a mirror-image fashion to mass 57, extends laterally between the walls 47 and 48.

As illustrated, the vibration isolation unit 24 is displaced slightly offcenter from symmetrical relation with the median plane 11, but nevertheless is more or less aligned with this plane.

The second vibration isolation means 25 may be considered to be substantially the same as the assembly 24. Thus, the second vibration isolation assembly includes fifth, sixth, seventh and eighth wall means 59, 60, 61 and 62, all of which are disposed generally parallel to the longitudinal plane 11. Walls 60 and 62 are disposed laterally outwardly of walls 61 and 59 and are connected by means 63 and 64 and threaded fastening means 65 and 66, with an under wall portion 67 of the assembly 12.

Walls 59 and 61 are interconnected by a force transmitting web 68. Web 68 extends generally tangentially and externally of the cylinder 4 and is connected by threaded fastening means 69 to an upper portion of the assembly 2, as defined by the cylinder or engine housing 4.

Walls 59 and 60 are interconnected by a third rhomboidal mass 70 while walls 61 and 62 are connected by a fourth rhomboidal mass 71.

Rhomboidal masses 70 and 71 are oriented substantially in the manner described in relation to the rhomboidal masses 57 and 58. It will be here noted that the second shock absorbing means 25 is mounted generally symmetrically in relation to the longitudinal median plane 11, with the walls 59 and 61 disposed, respectively, on opposite sides of this plane.

The third vibration isolation assembly 26 includes ninth and tenth wall means 72 and 73, each extending generally parallel with the plane 11.

Wall means 72 is connected by threaded fastening means 74 to one side 75 of handle leg 32. Wall means 73 is connected by threaded fastening means 76 to a bracket 77. Bracket 77, as shown in FIGS. 2 and 7, is connected with under portions 78 and 78a of the housing 4 of the first assembly 2. A fifth generally cylindrical, pluglike mass 79 of elastomeric material extends generally laterally between and is bonded to, the walls 72 and 73. Mass 79, like masses 57, 58, 70 and 71, is solid elastomeric material, not intersected by vibration absorption impeding mounting means.

As illustrated in FIG. 2, the generally longitudinal location of the third vibration isolation means 26, and the junction 34, is located within or intermediate the longitudinal extremities defined by the locations of the first and second vibration isolating units 24 and 25. Somewhat similarly, the junction between force transmitting member 35 and second assembly 12 is also located intermediate the longitudinal extremities defined by the locations of the units 24 and 25.

A flexible or elastomeric bellows 80 extends generally between the superposed second assembly 12 and first assembly 2. The lower end 81 of the bellows 80 is connected with an inlet port in the cylinder 3. The upper end 82 of the bellows 80 is connected with the discharge end 21a of the induction passage 21 of the carburetor 16. Bellows 80 provides a central passage 83, circumscribed by a flexible, convoluted wall 84, and operable to transmit fuel and air from the carburetor 16 to an air inlet port 85 in the cylinder 4. The ends 81 and 82 of bellows 80 may be biased into sealing engagement with port 85 and a wall portion 86 of assembly 12 communicating with passage 21 by an internal coil spring 87.

Bellows 80 is located generally symmetrically with respect to the plane 11 and is disposed longitudinally intermediate and shielded both laterally and longitudinally by the first and second vibration isolation units 24 and 25.

SUMMARY OF ADVANTAGES AND SCOPE OF INVENTION

An operator seeking to use the chain saw 1 does so by grasping the upper portion 36 of the handle 28 with one hand, and grasping the handle leg 29 with the other hand. With this arrangement, the operator is able to stabilize the unit by grasping the handle portion 36 and operate a trigger type throttle control 88 mounted in the handle 29.

Vibrations generated by the engine 3, cutter chain 6, and drive train are more or less aligned with a plane extending generally parallel with the longitudinal median plane 11. This generally planar alignment of principal vibration forces, coupled with the orientation of the shock absorbing units 24, 25 and 26 in general alignment with the median plane 11 (which more or less intersects the center of mass of the assembly 2), provides a cradling type of shock absorbing action disposed in an unusually efficacious alignment with vibration forces. The triangular orientation of the shock absorbing units, generally about the center of mass, provides a resilient cradling action uniquely capable of isolating vibrations emanating from the assembly 2. The maximized dispersion of units 24 and 25 provides an optimized containment of vibration forces.

The vibrations emanating from the assembly 2, and acting on the vertically spaced legs defined by components 32 and 12, are minimized by the vibration isolation units 24, 25 and 26 and constrained by the reinforcing action of the handle means 28 which interconnects, in force transmitting relation, the assembly 12 and the handle leg 32. With this reinforcing, an upward pull exerted by an operator on the handle portion 36 will tend to lift the entire chain saw rather than impose potentially damaging, separation forces on the units 24 and 25 interconnecting the assemblies 2 and 12.

The rhomboidal nature of the shock absorbing elastomeric or rubber masses 57, 58, 70 and 71 serves to permit optimum separation of the units 2 and 12. This configuration also enables vibration between these units to take place in a vertical plane, without inducing metal-to-metal contact between the wall components of the vibration isolation units and the mutually facing surfaces of the assemblies 2 and 12.

It will also be here noted that the resilient masses 57, 58, 70, 71 and 79 are all oriented so as to provide an effective absorption of vibration forces, with these forces acting on the masses so as to produce shear reaction forces, in lieu of the less desirable compression or tension forces.

Such compression forces as might act on the resilient masses, as a result of some minor lateral vibration tendencies, will all act externally and generally radially of the cylinder housing 4, i.e., tangentially of a circle coaxial with the axis of piston reciprocation. This will prevent the exertion of undesirable, potentially damaging compression forces on the cylinder, or on the engine or drive system components. The force transmitting web members 54 and 68 provide a unique, force transmitting and stabilizing influence independent of the structure of the assembly 2 and its engine or drive system components.

It will also be recognized that vibration forces imparted to the handle means 29 will be transmitted generally transversely to the handle means 28. Similarly, vibrations acting upon the handle means 28 will be transmitted generally transversely to the handle means 29. This transverse interaction of vibration forces between the handle components, it is believed, should tend to prevent or minimize vibration reinforcement tendencies.

The inclusion of the fuel tank 13, the carburetor 16 and air filter 17 in the assembly 12, to the exclusion of vibrating components of the chain saw, provides a nonvibration generating, inertia type, vibration dampening mass integrated with the handle defining cage 41. This inertial mass will provide a dampening influence in the cage 41, further minimizing the transmission of vibrations to an operator.

The flexible bellows 80 provides a flexible connection for transmitting fuel to an engine port. Any vibrations acting on the convolutions of this bellows may tend to set up agitation in the passage 83 conducive to the maintaining of fuel and air mixing insofar as flowing fuel and air is concerned. The unique shielding of the bellows 80, both longitudinally and laterally, by the vibration units 24 and 25 affords a unique degree of protection for the fuel and air transferring components of the chain saw.

With a preferred embodiment of the invention having been described, those familiar with the disclosure and skilled in the chain saw art may envision additions, deletions, substitutions or other modifications which would fall within the purview of the invention as set forth in the appended claims.

We claim:

1. A chain saw comprising:
engine means;
cutter chain means drivenly interconnected with said engine means;
said engine means including a crankshaft having an axis of rotation;
said cutter chain means being operable to traverse a path generally parallel to a plane perpendicular to said axis of rotation;
first, handle means extending circumferentially at least partially about said interconnected engine means and cutter chain means and extending generally transversely of said plane;
second, generally U-shaped handle means having a pair of spaced legs, with one leg being connected to said first handle means on an under portion of said interconnected engine means and cutter chain means;
vibration dampening, inertia means, including a fuel tank, interconnecting another leg of said second handle means and said first handle means;
said legs of said second handle means being disposed in generally parallel relation with said plane; and
at least three vibration isolating means disposed in a triangular pattern in general alignment with said plane and interconnecting said interconnected engine means and cutter chain means with said first and second handle means.

2. A chain saw comprising:
a first unitized assembly including
engine means,
guide bar means,
endless cutter chain means mounted on said guide bar means for traversal through a path circumscribing said guide bar and aligned with a cutting plane,
drive means interposed between said engine means and said cutter chain means;
a second unitized assembly including
fuel tank means, and
carburetor means;

said second assembly being superposed above said first assembly when said guide bar is oriented to position said cutting plane in substantially vertical alignment;
first vibration isolation means interposed between said first assembly and said second assembly;
second vibration isolation means interposed between said first assembly and said second assembly;
third vibration isolation means carried by said first assembly;
first handle means at least partially encircling said superposed first and second assembly and extending generally transversely of said travel path;
second handle means connected with said second assembly and said third vibration isolation means and extending generally longitudinally of said cutting plane; and
said first handle means being connected with said second assembly and with said second handle means.

3. A chain saw comprising:
a first unitized assembly including
engine means,
guide bar means,
endless cutter chain means mounted on said guide bar means for traversal through a path circumscribing said guide bar and aligned with a cutting plane,
drive means interposed between said engine means and said cutter chain means, said drive means including centrifugal clutch means, and
engine starting means;
a second unitized assembly including
fuel tank means,
carburetor means, and
air filter means operable to filter air supplied to said carburetor means,
said fuel tank means being operable to transmit fuel to said carburetor means;
said second assembly being superposed above said first assembly when said guide bar is oriented to position said cutting plane in substantially vertical alignment;
first vibration isolation means interposed between said first assembly and said second assembly;
second vibration isolation means interposed between said first assembly and said second assembly;
third vibration isolation means carried by said first assembly;
first handle means encircling said superposed first and second assembly and extending generally transversely of said travel path;
second handle means connected with said second assembly and said third vibration isolation means and extending generally longitudinally of said cutting plane;
said first handle means being connected with said second handle means adjacent said third vibration isolation means and also connected with said second assembly;
said first vibration isolation means being mounted at one end of said superposed first and second assemblies, generally adjacent said guide bar means;
said second vibration isolation means being mounted at another end of said superposed first and second assemblies generally adjacent said carburetor means;
said second handle means having
an upper portion extending from said other end of said second assembly, in general longitudinal alignment with a longitudinal median plane of said chain saw,
an intermediate, generally U-shaped end portion projecting generally outwardly of said superposed first and second assemblies, and returning to said first assembly, and
a lower portion passing longitudinally along the underside of said first assembly;
said third vibration isolation means being disposed on said underside of said first assembly;
said first handle means including a lower portion passing transversely of said longitudinal median plane and along said underside of said first assembly, said lower portion of said first handle means being connected with said second handle means generally adjacent said third vibration isolation means;

said first handle means further including
an upper portion projecting transversely across an upper side of said second assembly, when said second assembly is superposed above said first assembly, and
a force-transmitting member extending between said upper portion of said first handle means and said second assembly, with said force-transmitting member being connected with said upper portion of said second assembly;

said first assembly being resiliently cradled by, and extending longitudinally through said first handle means, with said first assembly being resiliently supported by said upper portion of said first handle means through said interconnected support member and second assembly, and with said first assembly being resiliently supported by said lower portion of said first handle means by said interconnected third vibration isolation means and second handle means;

said first assembly being resiliently cradled by and extending longitudinally of said second handle means, said first assembly being resiliently connected with said upper portion of said second handle means through said interconnected second assembly and said first and second vibration isolation means, and with said first assembly being resiliently connected with said lower portion of said second handle means by said third vibration isolation means;

flexible conduit means extending generally between said superposed first and second assembly and having a passage operable to transmit air and fuel from said carburetor means to said engine means, said flexible conduit means being located generally intermediate said first and second vibration isolation means; and said first, second and third vibration isolation means being generally aligned with said longitudinal median plane and spaced in a generally triangular pattern.

4. A chain saw comprising:
a first unitized assembly including
engine means including a cylinder and piston,
guide bar means,
endless cutter chain means mounted on said guide bar means for traversal through a path circumscribing said guide bar and aligned with a cutting plane,
drive means interposed between said engine means and said cutter chain means, said drive means including centrifugal clutch means, and
engine starting means;
a second unitized assembly including
fuel tank means,
carburetor means,
air filter means operable to filter air supplied to said carburetor means, and
said fuel tank means being operable to transmit fuel to said carburetor means;
said second assembly being superposed above said first assembly when said guide bar is oriented to position said cutting plane in substantially vertical alignment;
first vibration isolation means interposed between said first assembly and said second assembly;
second vibration isolation means interposed between said first assembly and said second assembly;
third vibration isolation means carried by said first assembly;
first handle means encircling said superposed first and second assembly and extending generally transversely of said travel path;
second handle means connected with said second assembly and said third vibration isolation means and extending generally longitudinally of said cutting plane;

said first handle means being connected with said second assembly and said first handle means being also connected with said second handle means generally adjacent said third vibration isolation means;

said first vibration isolation means being mounted at one end of said superposed first and second assemblies, generally adjacent said guide bar means, and spaced inwardly of lateral extremities of said engine means, said first vibration isolation means including
first wall means extending in generally parallel relation with said cutting plane, connected with said first assembly, and disposed on one side of a longitudinal median plane of said chain saw, which median plane extends generally parallel with said cutting plane,
second wall means extending generally parallel with said cutting plane, disposed laterally outwardly of said first wall means, connected with said second assembly, and disposed on said one side of said longitudinal median plane,
a first, generally rhomboidal mass of resilient elastomeric material extending laterally between said first and second wall means and connected thereto, and projecting laterally outwardly of said first wall means and away from said second assembly,
third wall means extending generally parallel with said cutting plane, connected with said first assembly, and disposed on a side of said longitudinal median plane opposite to said one side,
fourth wall means extending generally parallel to said cutting plane, disposed laterally outwardly of said third wall means, connected with said second assembly, and disposed on said opposite side of said longitudinal median plane, and
a second, generally rhomboidal mass of elastomeric material extending laterally between said third and fourth wall means and connected thereto and projecting laterally outwardly of said third wall means and away from said second assembly;

said second vibration isolation means being mounted at another end of said superposed first and second assemblies generally adjacent said carburetor means and spaced inwardly of the lateral extremities of said engine means; said second vibration isolation means including
fifth wall means extending in generally parallel relation with said cutting plane, connected with said first assembly, and disposed on said one side of said longitudinal median plane,
sixth wall means extending generally parallel with said cutting plane, disposed laterally outwardly of said fifth wall means, connected with said second assembly, and disposed on said one side of said longitudinal median plane,
a third, generally rhomboidal mass of resilient elastomeric material extending laterally between said fifth and sixth wall means and connected thereto, and projecting laterally outwardly of said fifth wall means and away from said second assembly,
seventh wall means extending generally parallel to said cutting path, connected with said first assembly, and disposed on said side of said longitudinal median plane opposite to said one side,
eighth wall means extending generally parallel to said cutting plane, disposed laterally outwardly of said seventh wall means, connected with said second assembly, and disposed on said opposite side of said longitudinal median plane, and
a fourth mass of elastomeric material extending laterally between said seventh and eighth wall means and connected thereto, and projecting laterally outwardly of said seventh wall means and away from said second assembly;

said second handle means, when said second assembly is superposed above said first assembly, having an upper portion extending from said other end of said second assembly, in general longitudinal alignment with said longitudinal median plane, an intermediate, generally U-shaped end portion projecting generally outwardly of said superposed first and second assemblies, and returning to said first assembly, and a lower portion passing longitudinally along the underside of said first assembly;

said third vibration isolation means being disposed on said underside of said first assembly and including ninth wall means extending generally parallel to said cutting plane and connected with said second handle means, tenth wall means extending generally parallel to said cutting plane and connected with the underside of said first assembly, and a fifth mass of resilient, elastomeric material extending laterally between and connected with said ninth and tenth wall means;

said first handle means including a lower portion passing transversely of said longitudinal median plane and along said underside of said first assembly, said lower portion of said first handle means being connected with said second handle means generally adjacent said third vibration isolation means at a location generally longitudinally intermediate the locations of said first and second vibration isolation means;

said first handle means further including an upper portion projecting transversely across an upper side of said second assembly, when said second assembly is superposed above said first assembly, and a force-transmitting member extending between said upper portion of said first handle means and said second assembly, with said force-transmitting member being connected with said upper portion of said second assembly at a location generally intermediate the locations of said first and second vibration isolation means;

said first assembly being resiliently cradled by, and extending longitudinally through said first handle means, with said first assembly being resiliently supported by said upper portion of said first handle means through said interconnected support member and second assembly, and with said first assembly being resiliently supported by said lower portion of said first handle means by said interconnected third vibration isolation means and second handle means;

said first assembly being resiliently cradled by and extending longitudinally of said second handle means, said first assembly being resiliently connected with said upper portion of said second handle means through said interconnected second assembly and said first and second vibration isolation means, and with said first assembly being resiliently connected with said lower portion of said second handle means by said third vibration isolation means;

flexible bellows means extending generally between said superposed first and second assembly and having a passage operable to transmit air and fuel from said carburetor means to said engine means, said flexible bellows means being located generally intermediate said first and second vibration isolation means;

said first, second and third vibration isolation means being generally aligned with said longitudinal median plane and spaced generally symmetrically and radially from a center of mass of said first assembly;

force-transmitting first web means extending generally tangentially of said cylinder, interconnecting said first and third wall means, and connected with said cylinder; and force-transmitting second web means extending generally tangentially of said cylinder, interconnecting said fifth and seventh wall means, and connected with said cylinder.

5. A chain saw comprising:

engine means including a crankshaft;

cutter chain means drivenly connected with said engine means and operable to traverse a cutting path aligned with a cutting plane;

said engine means and cutter chain means comprising a first assembly operable to generate vibrations;

vibration dampening inertia means comprising a second assembly including fuel tank means, said second assembly being superposed above said first assembly when said cutting plane is generally vertically disposed;

handle means connected with said second assembly; and a plurality of vibration isolating means interconnecting said first assembly with said connected second assembly and handle means;

said plurality of vibration isolating means including at least three mutually spaced vibration isolating means disposed outwardly of the center of mass of said first assembly;

said crankshaft having an axis of rotation extending transversely of said cutting plane;

said plurality of vibration isolating means being spaced about the center of mass of said first assembly and operable to define a resilient cradle for said first assembly encircling said center of mass and the axis of rotation of said crankshaft;

said three mutually spaced, vibration isolating means being generally aligned with a plane extending transversely of said axis of rotation of said crankshaft, with at least one of said three vibration isolating means being disposed above said center of mass and at least one other of said three vibration isolating means being disposed below said center of mass when said cutting plane is generally vertically disposed; and said one of said three vibration isolating means disposed below said center of mass interconnecting said first assembly with said handle means.

6. A chain saw as described in claim 5:

wherein said three vibration isolating means are disposed in a generally triangular pattern displaced generally laterally of said cutting plane;

wherein at least two of said three vibration isolating means are interposed directly between said first and second assembly; and wherein said three vibration isolating means are disposed generally outwardly of said engine means and are operable in shear to absorb vibrations generated by said first assembly.